US011370074B2

(12) United States Patent
Viscardi (10) Patent No.: US 11,370,074 B2
(45) Date of Patent: Jun. 28, 2022

(54) LINE OF A MANUFACTURING PLANT FOR ASSEMBLING OF MULTICOMPONENT ARTICLES

(71) Applicant: COSBERG S.p.A., Bergamo (IT)

(72) Inventor: Gianluigi Carlo Viscardi, Bergamo (IT)

(73) Assignee: COSBERG S.p.A., Bergamo (IT)

( * ) Notice: Subject to any disclaimer, the term of this patent is extended or adjusted under 35 U.S.C. 154(b) by 316 days.

(21) Appl. No.: 16/324,042

(22) PCT Filed: Jul. 27, 2017

(86) PCT No.: PCT/IB2017/054572
§ 371 (c)(1),
(2) Date: Feb. 7, 2019

(87) PCT Pub. No.: WO2018/029562
PCT Pub. Date: Feb. 15, 2018

(65) Prior Publication Data
US 2019/0160611 A1 May 30, 2019

(30) Foreign Application Priority Data

Aug. 8, 2016 (IT) .................... 102016000083517

(51) Int. Cl.
*B23P 21/00* (2006.01)
*B21J 15/14* (2006.01)
(Continued)

(52) U.S. Cl.
CPC ............. *B23P 21/004* (2013.01); *B21J 15/14* (2013.01); *E05D 3/142* (2013.01);
(Continued)

(58) Field of Classification Search
CPC . B21D 53/40; B21J 15/10–365; B23P 21/004
See application file for complete search history.

(56) References Cited

U.S. PATENT DOCUMENTS 1,456,862 A * 5/1923 Berry .................... B21D 53/40
29/11
1,463,146 A * 7/1923 Bernard ................... B21J 15/10
72/446
(Continued)

FOREIGN PATENT DOCUMENTS

CN 85204583 U 12/1987
CN 202155702 U 3/2012
(Continued)

OTHER PUBLICATIONS

First Office Action for corresponding Chinese Patent Application No. 201780045261.7 dated Dec. 27, 2019, 19 pages.
(Continued)

*Primary Examiner* — Jacob J Cigna
(74) *Attorney, Agent, or Firm* — Merchant & Gould P.C.

(57) ABSTRACT

An assembly line (40) includes a transport system having pallets (70), a riveting machine (100) with a stop device (1005) and a riveting device (1010), and a crushing head (1011). The stop device (1005) and the riveting device (1010) flank the pallet (70) on opposite sides, while a stop (1006) of the stop device (1005) and the crushing head (1011) are translatable to approach the article from opposite sides during assembly.

17 Claims, 13 Drawing Sheets

(51) Int. Cl.
  *E05D 3/14* (2006.01)
  *E05D 11/10* (2006.01)
  *E05D 9/00* (2006.01)

(52) U.S. Cl.
  CPC ............ *E05D 11/1021* (2013.01); *E05D 9/00* (2013.01); *E05Y 2800/45* (2013.01)

(56) References Cited

U.S. PATENT DOCUMENTS

| | | | |
|---|---|---|---|
| 3,432,925 A | | 3/1969 | Woolley |
| 3,559,256 A | * | 2/1971 | Lemelson ........ G05B 19/41815 29/33 P |
| 4,369,872 A | * | 1/1983 | Sticht ................... B23Q 7/1468 198/345.3 |
| 4,519,534 A | * | 5/1985 | White ................... B23P 19/006 227/117 |
| 5,072,495 A | | 12/1991 | Kautt |
| 2014/0217227 A1 | * | 8/2014 | Kilibarda ............... B21J 15/323 242/555.3 |
| 2014/0230242 A1 | * | 8/2014 | Flis ........................ B21J 15/28 29/798 |
| 2015/0266147 A1 | * | 9/2015 | Reid ..................... B23P 21/004 29/525.01 |

FOREIGN PATENT DOCUMENTS

| | | | | |
|---|---|---|---|---|
| CN | 103386607 A | | 11/2013 | |
| CN | 105127742 B | * | 10/2017 | |
| GB | 462341 A | * | 3/1937 | ............. B21J 15/10 |
| WO | 2014/177979 A2 | | 11/2014 | |
| WO | 2014/177985 A1 | | 11/2014 | |

OTHER PUBLICATIONS

Second Office Action for corresponding Chinese Patent Application No. 201780045261.7 dated Sep. 2, 2020, 16 pages.
International Search Report and Written Opinion of the International Searching Authority for International Patent Application No. PCT/IB2017/054572 dated Nov. 13, 2017, 10 pages.

* cited by examiner

LINE OF A MANUFACTURING PLANT FOR ASSEMBLING OF MULTICOMPONENT ARTICLES

This application is a National Stage Application of PCT/IB2017/054572, filed 27 Jul. 2017, which claims the benefit of Ser. No. 10/201,6000083517, filed 8 Aug. 2016 in Italy, and which applications are incorporated herein by reference. To the extent appropriate, a claim of priority is made to each of the above-disclosed applications.

BACKGROUND OF THE INVENTION

The object of the present invention is a line of a manufacturing plant for assembling of multicomponent articles, in particular for the assembly of hinges for furniture doors. E.g. document U.S. Pat. No. 5,072,495A discloses an installation according to the preamble of claim 1.

In the field of assembly plants of articles, it is essential that the machines are able to produce high volumes in a short time. Only in the presence of these features, in fact, the system cost can be amortized in a short time and the investment can be profitable.

In the field of production of machines for such plants, therefore, there is a tendency to create ever faster lines, sometimes able to produce tens of thousands of articles a day. It is however essential to minimize waste and obtain articles having an optimal functionality, even when consisting of several components designed for relative movements, as in the case of hinges for furniture doors.

SUMMARY OF THE INVENTION

The object of the present invention is to provide an assembly line of a system for multicomponent articles that meets the needs of the sector.

BRIEF DESCRIPTION OF THE DRAWINGS

The features and the advantages of the assembly line according to the present invention will appear more clearly from the following description, made by way of an indicative and non-limiting example with reference to the following figures, in which.

DETAILED DESCRIPTION OF THE PREFERRED EMBODIMENT

For clarity of description, hereinafter reference will be made to hinges and their components; however, the object of the present invention is an assembly line for a generic article consisting of components riveted to each other.

Figure 1A:
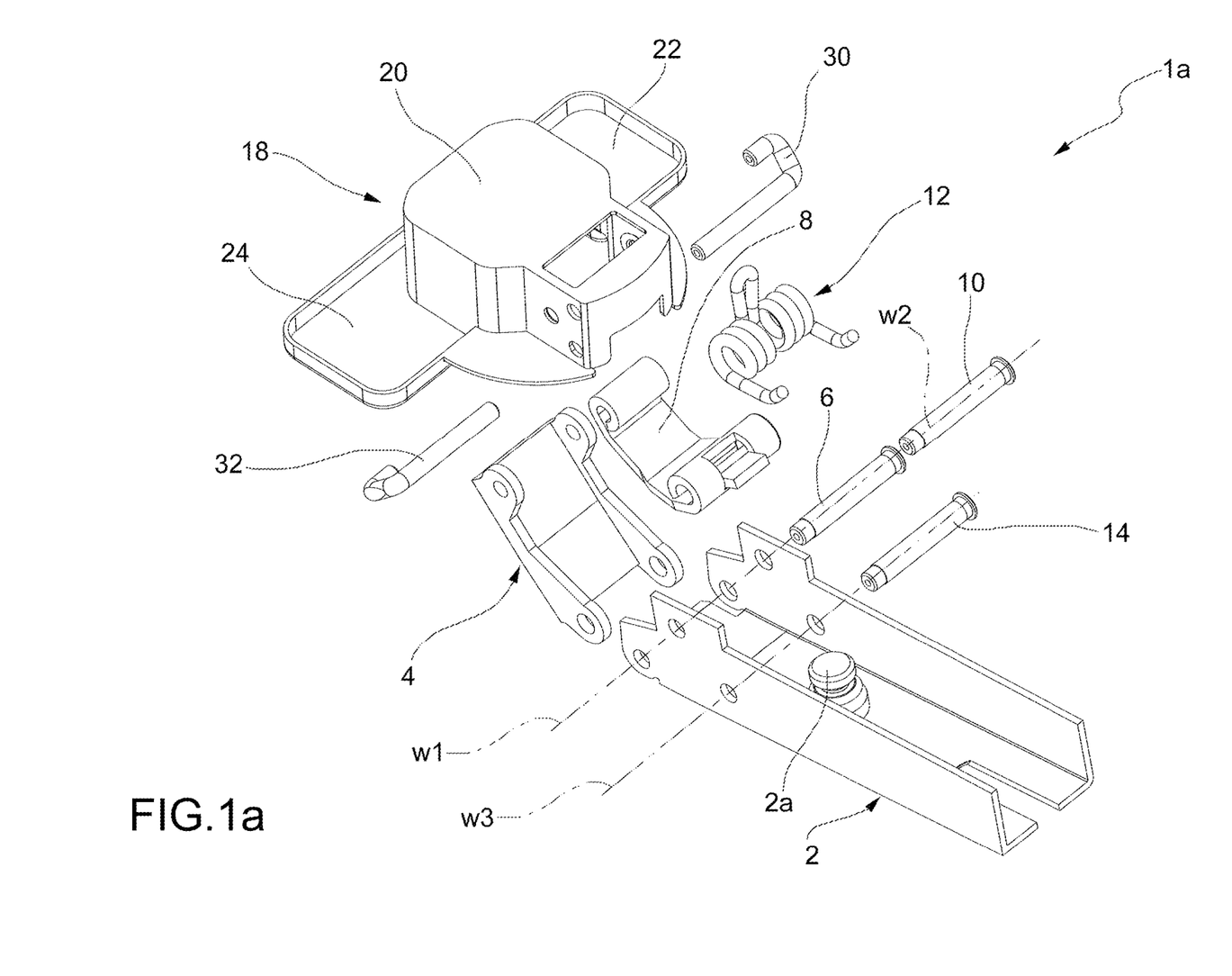
FIG. 1a shows an exemplary embodiment of a hinge for furniture doors, in separate parts.

With reference to FIG. 1a, reference numeral 1a denotes a multicomponent article, in particular a hinge for furniture doors, according to a first example.

Hinge 1a comprises a wing 2, intended to be applied to a wall of a cabinet. Wing 2 is provided with a plurality of holes for the insertion of rivets, for example, three holes are provided having respective hole axes W1, W2, W3.

Hinge 1a further comprises an outer plate 4, hinged to wing 2 through a first rivet 6, inserted into the first hole, having a hole axis W1.

Wing 2 is also already provided with a dowel 2a.

Hinge 1a further comprises an inner plate 8, hinged to wing 2 through a second rivet 10, inserted into a second hole having a hole axis W2 and resting against the outer plate 4.

Hinge 1a further comprises a spring 12, hinged to wing 2 through a third rivet 14, inserted into a third hole having a hole axis W3 and operating on the inner plate 4 so as to push it permanently towards the outer plate 4.

Hinge or article 1a also comprises a box 18 consisting of a central body 20 and lateral portions 22, 24.

Typically, the lateral portions 22, 24 are engaged with respective screws for the attachment to the leaf of the cabinet, while the central body 20 is engaged with the inner plate 8 and the outer plate 4 through a first clamp 30 and to the outer plate 4 through a second clamp 32. Clamps 30, 32 are preferably J-shaped.

According to a further exemplary embodiment (FIG. 1b), hinge 1b comprises wing 2 provided with two holes for the insertion of rivets, the outer plate 4 hinged to wing 2 through the first rivet 6, and the inner plate 8 hinged to wing 2 through the second rivet 10.

Figure 1B:
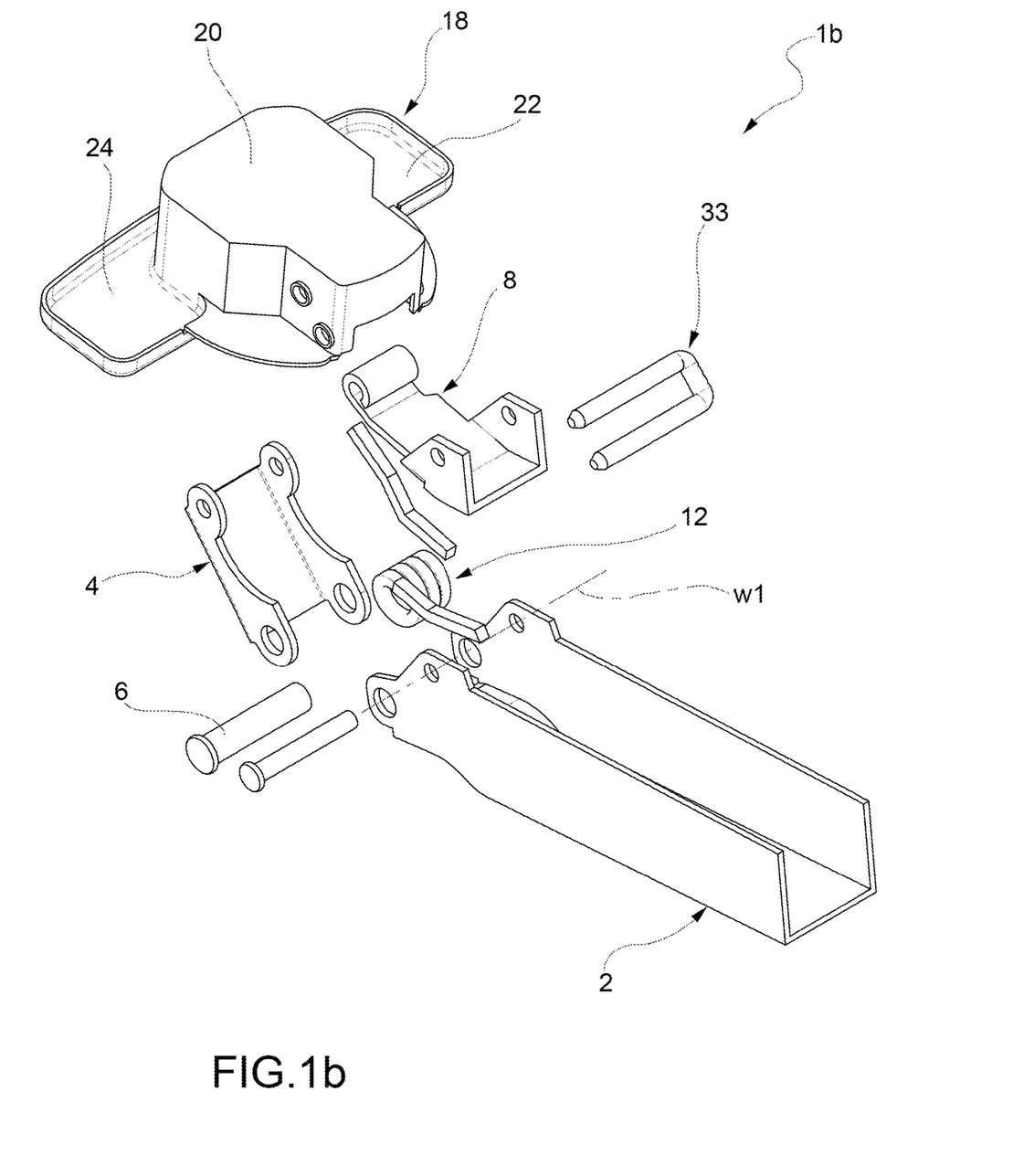
FIG. 1b shows a further exemplary embodiment of a hinge for furniture doors, in separate parts.

Said hinge 1b further comprises spring 12, hinged to wing 2 again through the first rivet 6, and box 18 consisting of the central body 20 and the lateral portions 22, 24. The central body 20 is engaged with the inner plate 8 and the outer plate 4 through a U-shaped clamp 33.

A system for the assembly of article 1a, 1b, according to a first embodiment (FIG. 2a), comprises an assembly line 40, comprising a transport system for the advancement of the article being assembled along an advancement direction X, substantially rectilinear.

Figure 2A:
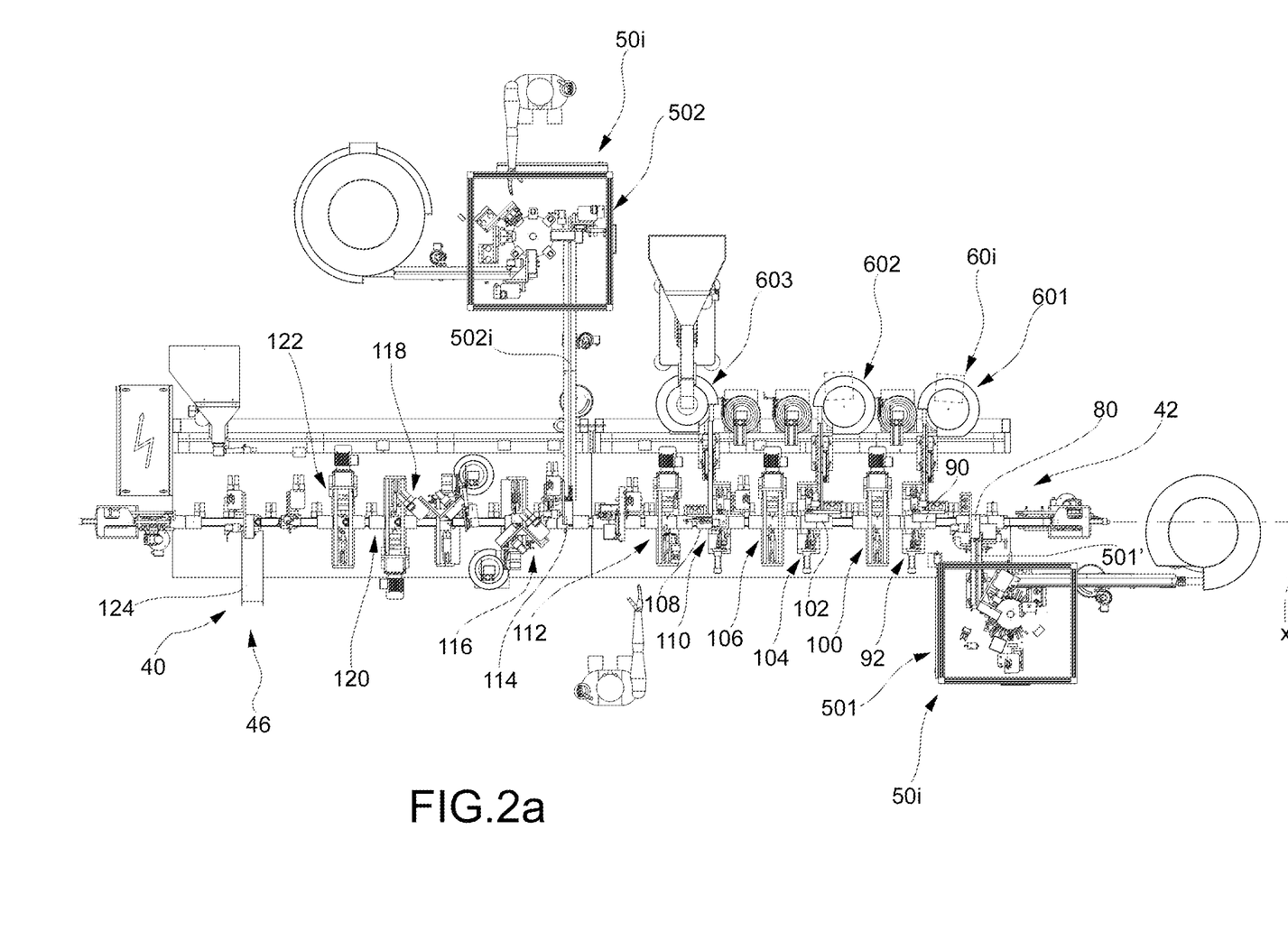
FIG. 2a schematically shows a lay-out of an assembly system comprising an assembly line according to an embodiment of the present invention.

For example, the transport system comprises a conveyor belt 42, with constrained or free pallets, which travels horizontally, i.e. on an imaginary transport plane parallel to the ground plane, taken as a reference. The advancement direction X is therefore contained in the imaginary transport plane.

Line 40 is flanked by multiple secondary assembly devices 50i for the assembly of groups of components and the feeding to line 40, and by multiple feeding devices 60i, for feeding individual components to said assembly line 40.

The article being assembled is transported by the conveyor belt 42, from an inlet end to an outlet end thereof, supported by a pallet 70 (FIGS. 3 to 9).

According to a preferred embodiment, pallet 70 comprises a main support 72, for example in the form of plate, for example rectangular, and a support structure 74, placed on the main support 72, intended to stably support the article being assembled, for example by magnetic means.

Preferably, the support structure 74 comprises a base body 76, resting on the main support 72, and a projecting body 78, vertically projecting from the base body 76, so as to constitute as a whole a support structure in the shape of an "L" resting with long stem on the main support 72.

Figure 3:
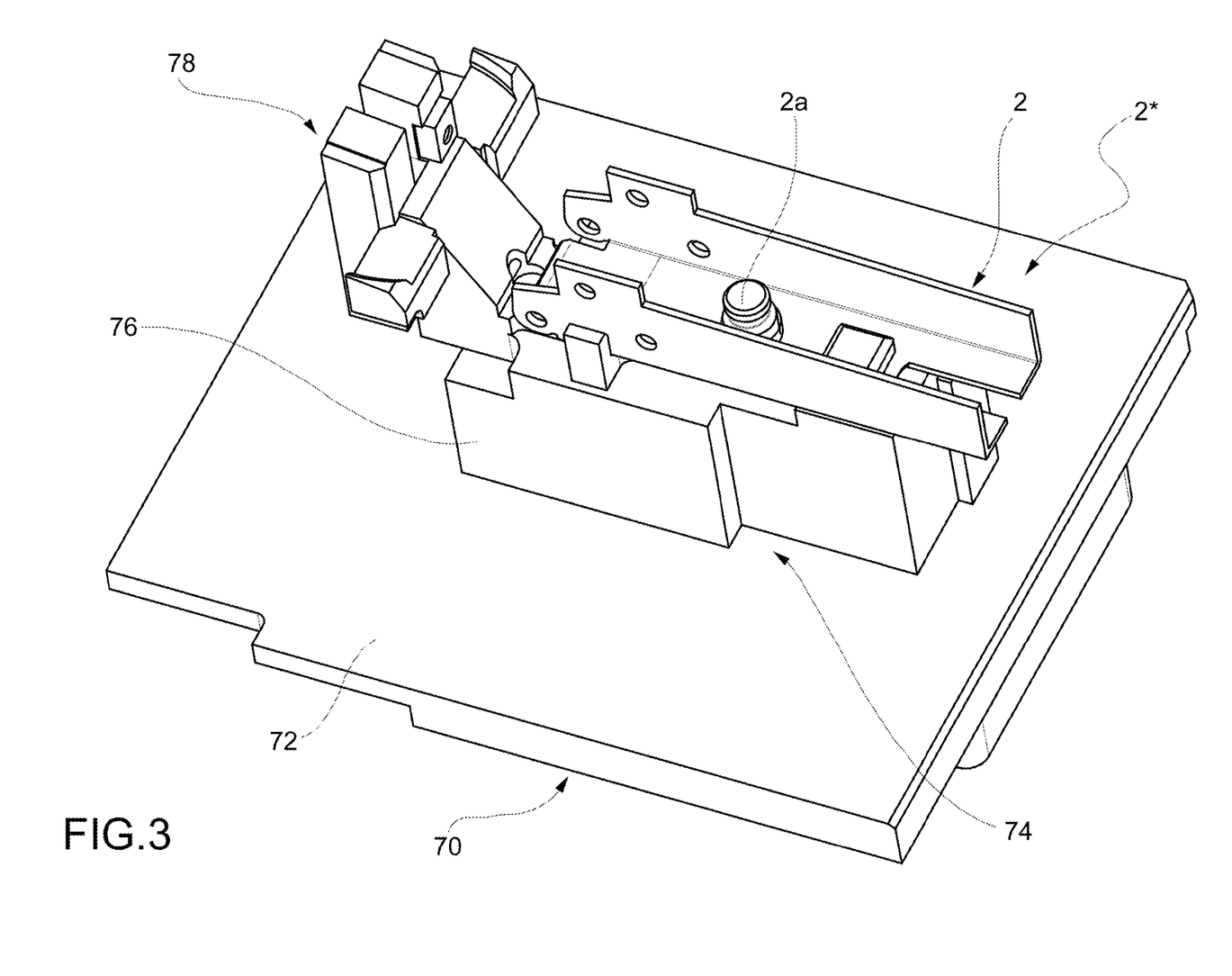
FIGS. 3 to 9 show the hinge in FIG. 1a during the assembly steps, the line supported by a transport pallet according to the invention.
Figure 4:
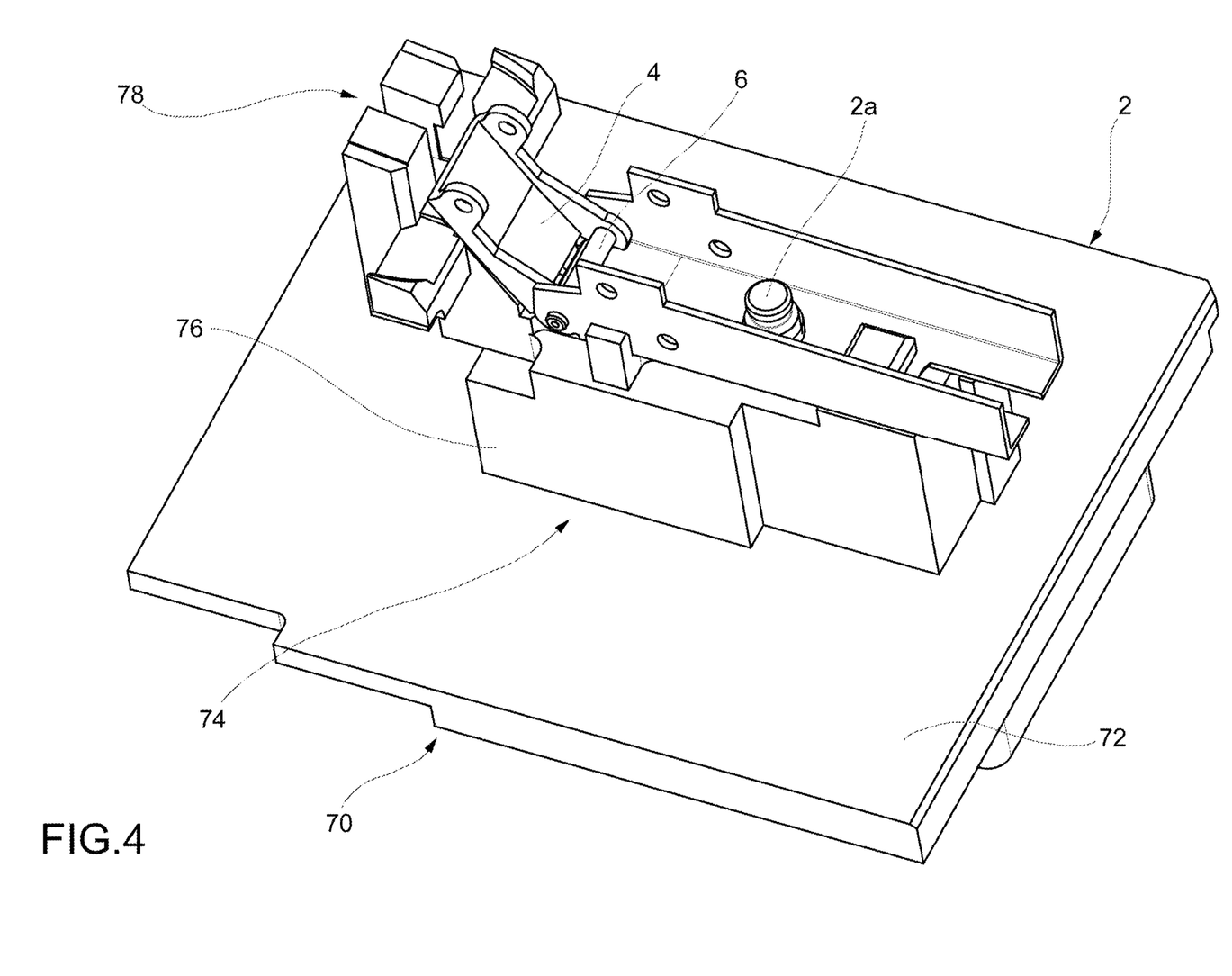
Figure 5:
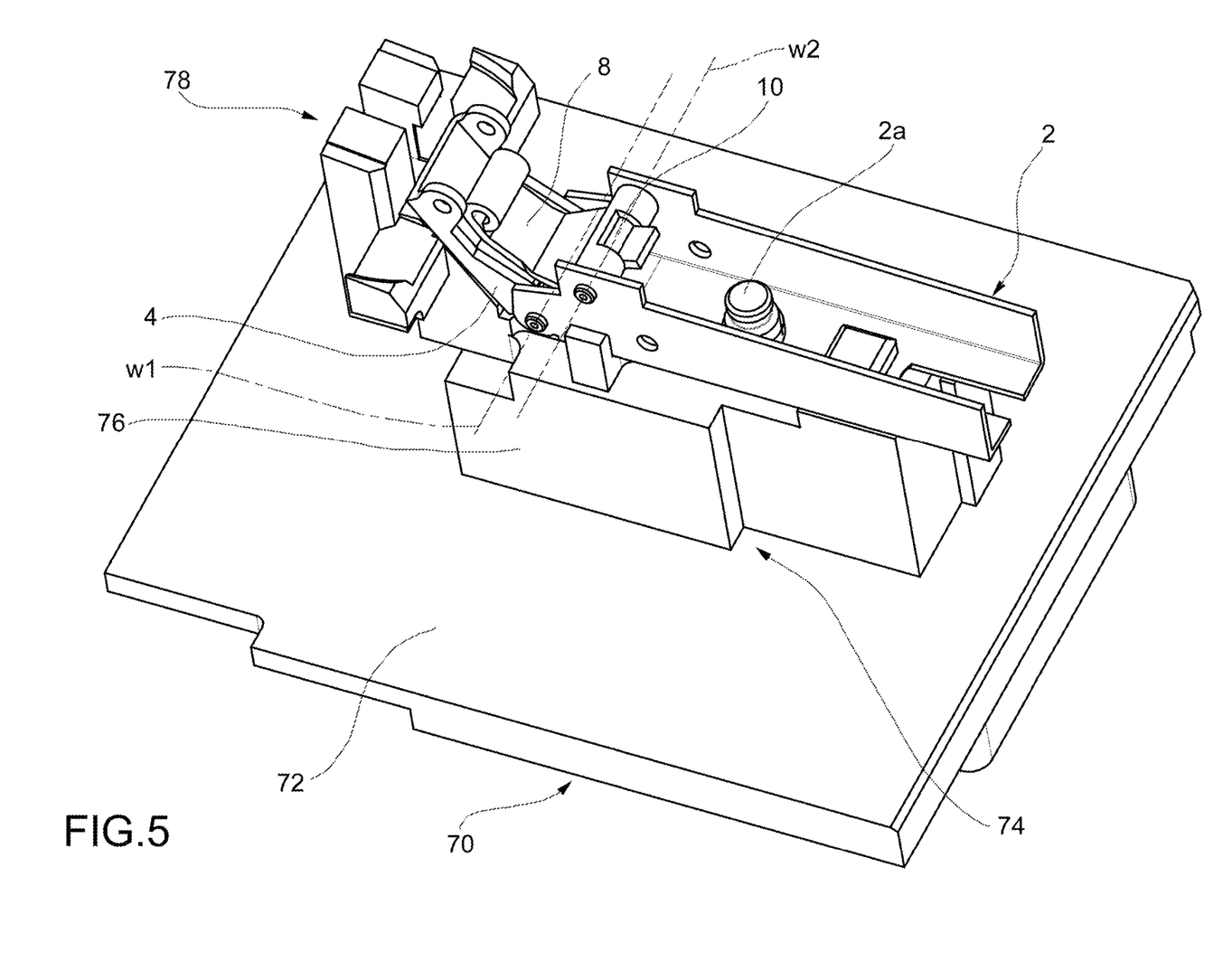
Figure 6:
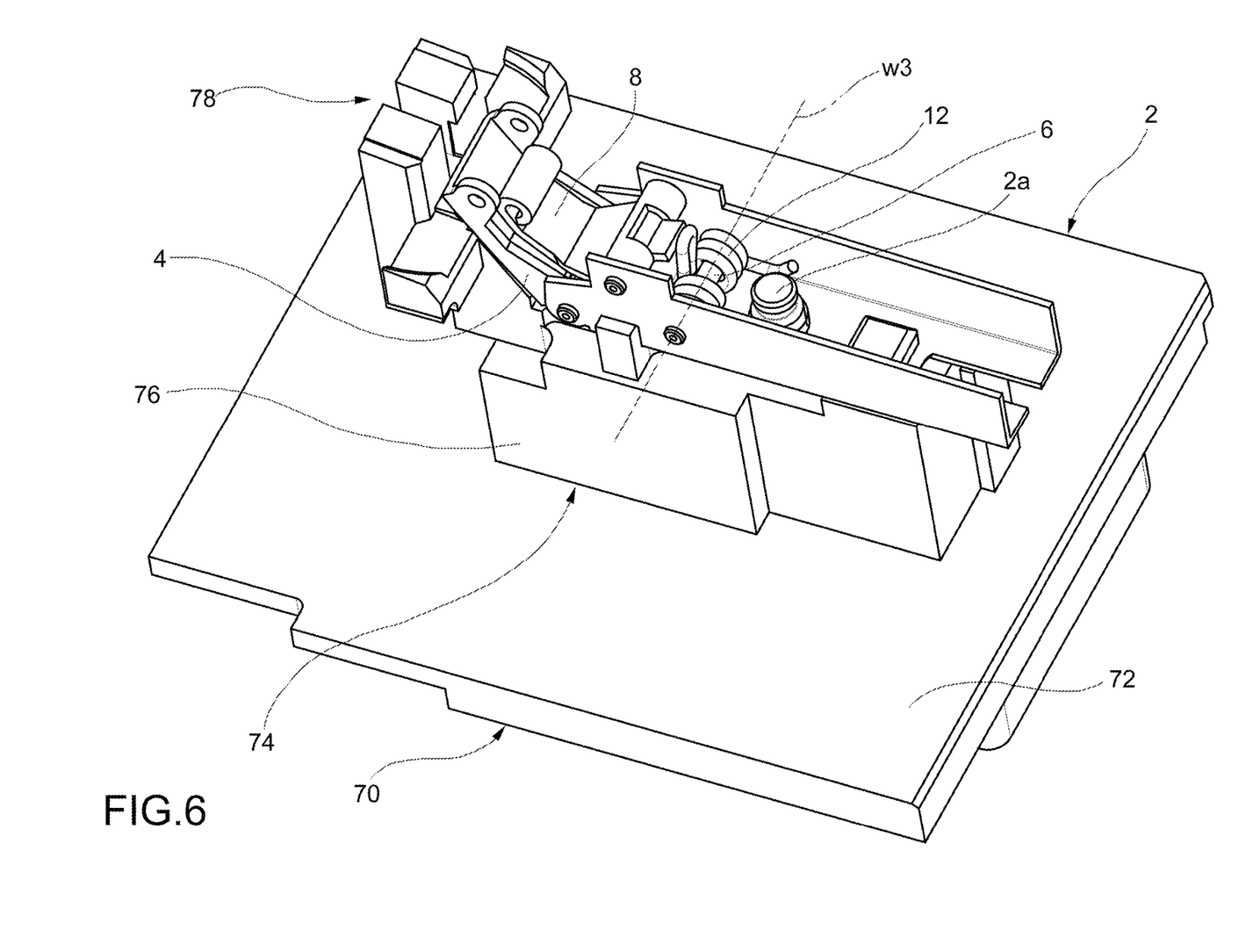
Figure 7:
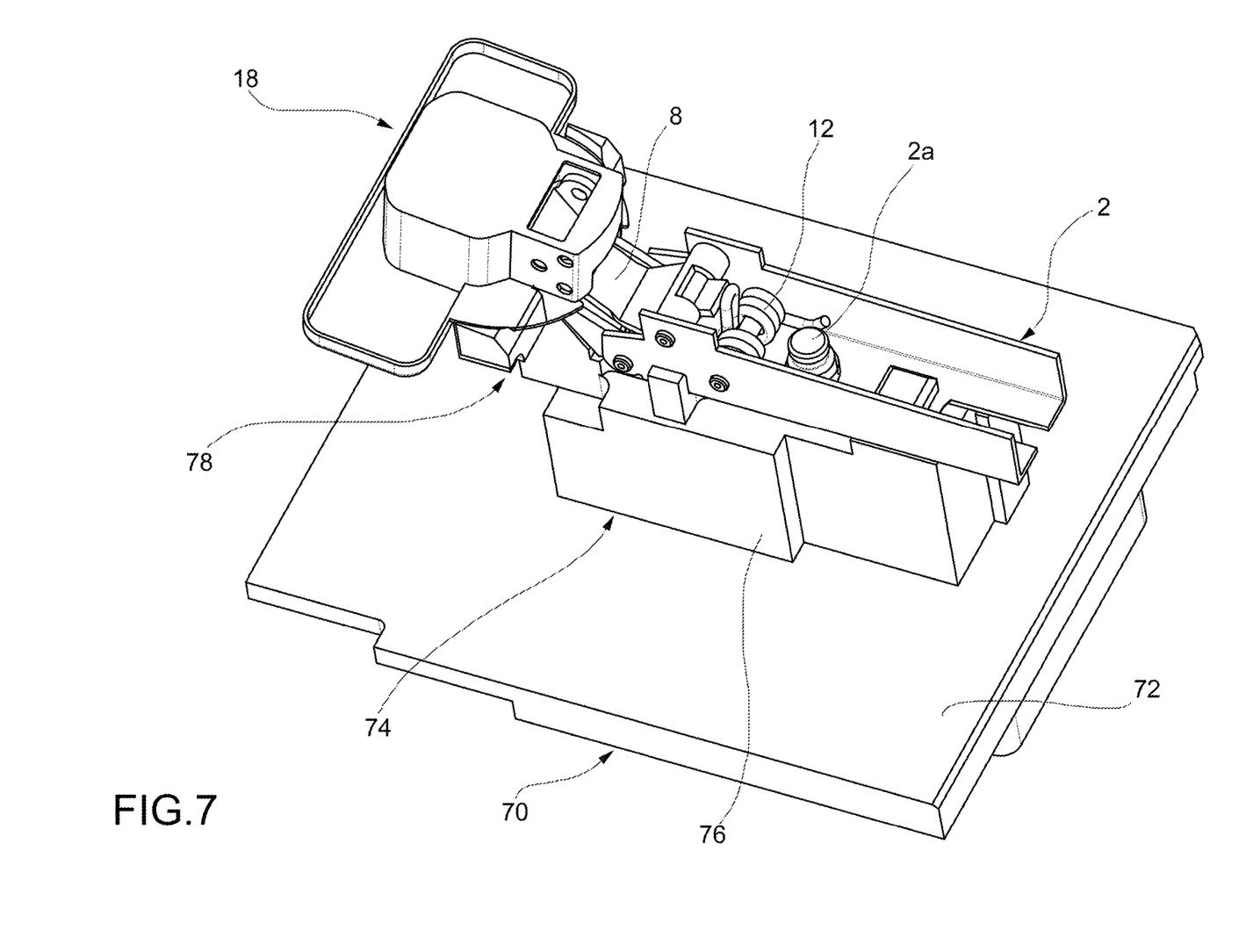
Figure 8:
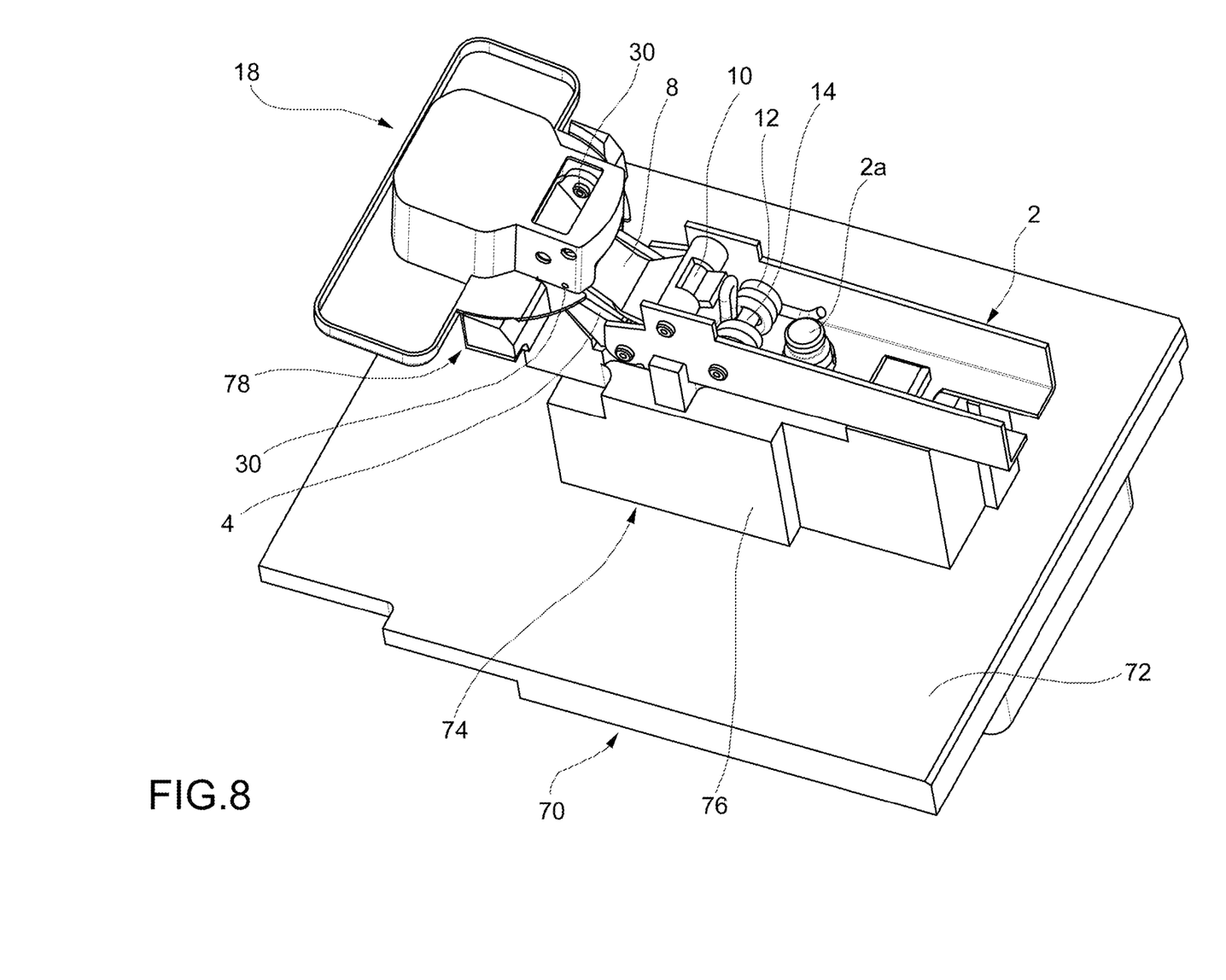
Figure 9:
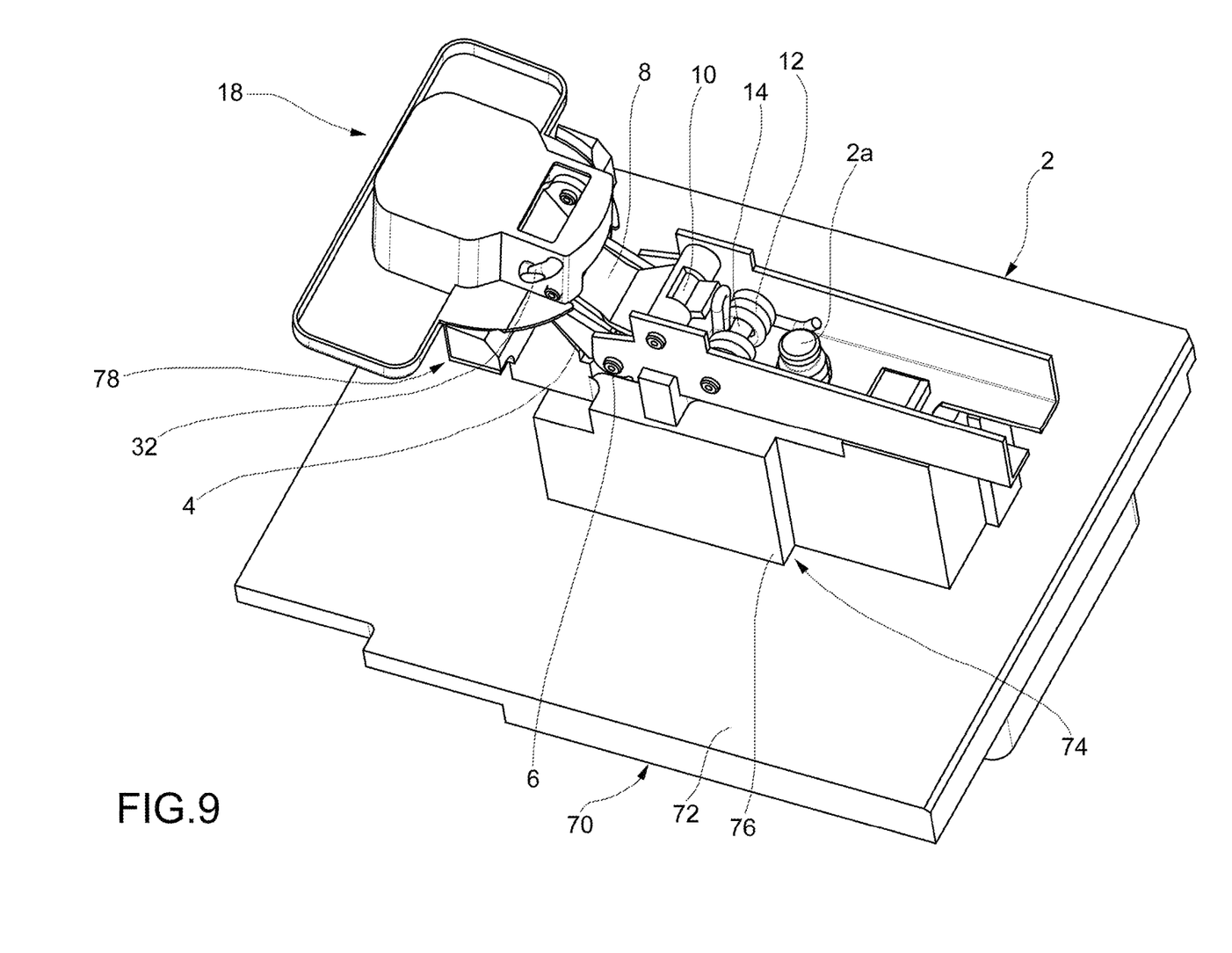

FIGS. 3 to 9 illustrate the assembly sequence of article 1*a*, in the example in FIG. 1*a*, supported by pallet 70. In particular:

FIG. 3 shows pallet 70 which supports wing 2 provided with dowel 2*a*, resting on the base body 76 of the support structure 74, so that the hole axes W1, W2, W3 of wing 2 are parallel to the imaginary transport plane and orthogonal to the advancement direction X;

FIG. 4 shows pallet 70 which supports wing 2 with dowel 2*a* and the outer plate 4 hinged to wing 2 through the first rivet 6, in abutment with the projecting body 78 of the support structure 74, so as to remain inclined with respect to wing 2;

FIG. 5 shows, in addition, the inner plate 8 hinged to wing 2 through the second rivet 10, leaning against the outer plate 4;

FIG. 6 shows, in addition, spring 12 hinged to wing 2 through the third rivet 14, in abutment with the inner plate 8;

FIG. 7 shows, in addition, box 18, which may already be provided with the screws, coupled with the inner plate 4 and with the outer plate 8, supported by the projecting body 78 of the support structure 74; and FIGS. 8 and 9 show box 18 engaged with the outer plate 4 and with the inner plate 8 through the first clamp 30 and the second clamp 32.

With reference to FIG. 2*a*, at the inlet end, the assembly line 40 is fed with a first sub-group 2* consisting of wing 2 and dowel 2*a*, screwed to wing 2.

To this end, the assembly system comprises a first secondary assembly device 501, adapted to manipulate wing 2 and dowel 2*a*, which are fed separately thereto, so as to screw dowel 2*a* to wing 2.

Device 501 further comprises feeding means for feeding the first sub-group 2* to line 40; for example, said feeding means comprise a secondary belt 501', orthogonal to the conveyor belt 42.

Line 40 comprises a pallet loading station 80, in which the first sub-group 2* is loaded on a pallet 70 and placed on the conveyor belt 42.

Line 40 is also fed with a first component of the article, for example with the outer plate 4.

To this end, the system comprises a first feeding device 601 suitable for feeding said first component to line 40, downstream of the pallet loading station 80.

Line 40 further comprises a first loading device 90 which receives the first component from the first feeding device 601 and pallet 70 with the first sub-group 2* transported by the conveyor belt 42; said first loading device 90 applies the outer plate 4 to the first sub-group 2*.

Preferably, said first loading device 90 is a pick & place robot. For example, the structural and functional features of the loading device are illustrated in documents WO2014/177985 and WO2014/177979, in the name of the Applicant.

Additionally, line 40 comprises a first insertion device 92, which inserts the first rivet 6 in the first hole of wing 2, along the hole axis W1, so as to hinge the outer plate 4 to wing 2.

Line 40 further comprises a first riveting machine 100, operating downstream of the first insertion device 92, suitable for riveting the first rivet 6 to wing 2.

Downstream of the first riveting machine, line 40 is provided with a second loading device 102, fed by a second feeding device 602 for loading the inner plate 8; a second insertion device 104 for inserting the second rivet 10 in the second hole of wing 2, along the hole axis W2, so as to hinge the inner plate 8 to wing 2; a second riveting machine 106, operating downstream of the second insertion device 92, suitable for riveting the second rivet 10 to wing 2.

Downstream of the second riveting machine, line 40 is provided with a third loading device 108, fed by a third feeding device 603 for loading spring 12; a third insertion device 110 for inserting the third rivet 10 in the third hole of wing 2, along the hole axis W3, so as to hinge spring 12 to wing 2; a third riveting machine 112, operating downstream of the third insertion device 108, suitable for riveting the third rivet 14 to wing 2.

Downstream of the third riveting machine 112, line 40 is fed with a second sub-group consisting of box 18 and of the screws screwed to box 18.

To this end, the assembly system comprises a second secondary assembly device 502, adapted to manipulate box 18 and the screws, which are fed separately thereto, so as to screw the screws to box 18. Device 502 further comprises feeding means for feeding the second sub-group to line 40; for example, said feeding means comprise a secondary belt orthogonal to the conveyor belt 42.

Line 40 further comprises a further loading device 114 for loading the second sub-group, coupling it to the outer plate 4 and to the inner plate 8, further insertion devices 116, 118 for the insertion of clamps 30, 32 (or clamp 33), and further riveting machines 120, 122 for riveting said bolts 30, 32 to box 18.

Finally, line 40 is provided with discharge means 124 for removing pallet 70 with hinge 1 assembled from the conveyor belt 42; for example, said discharge means comprise a discharge conveyor orthogonal to the advancement direction X.

Figure 2B:
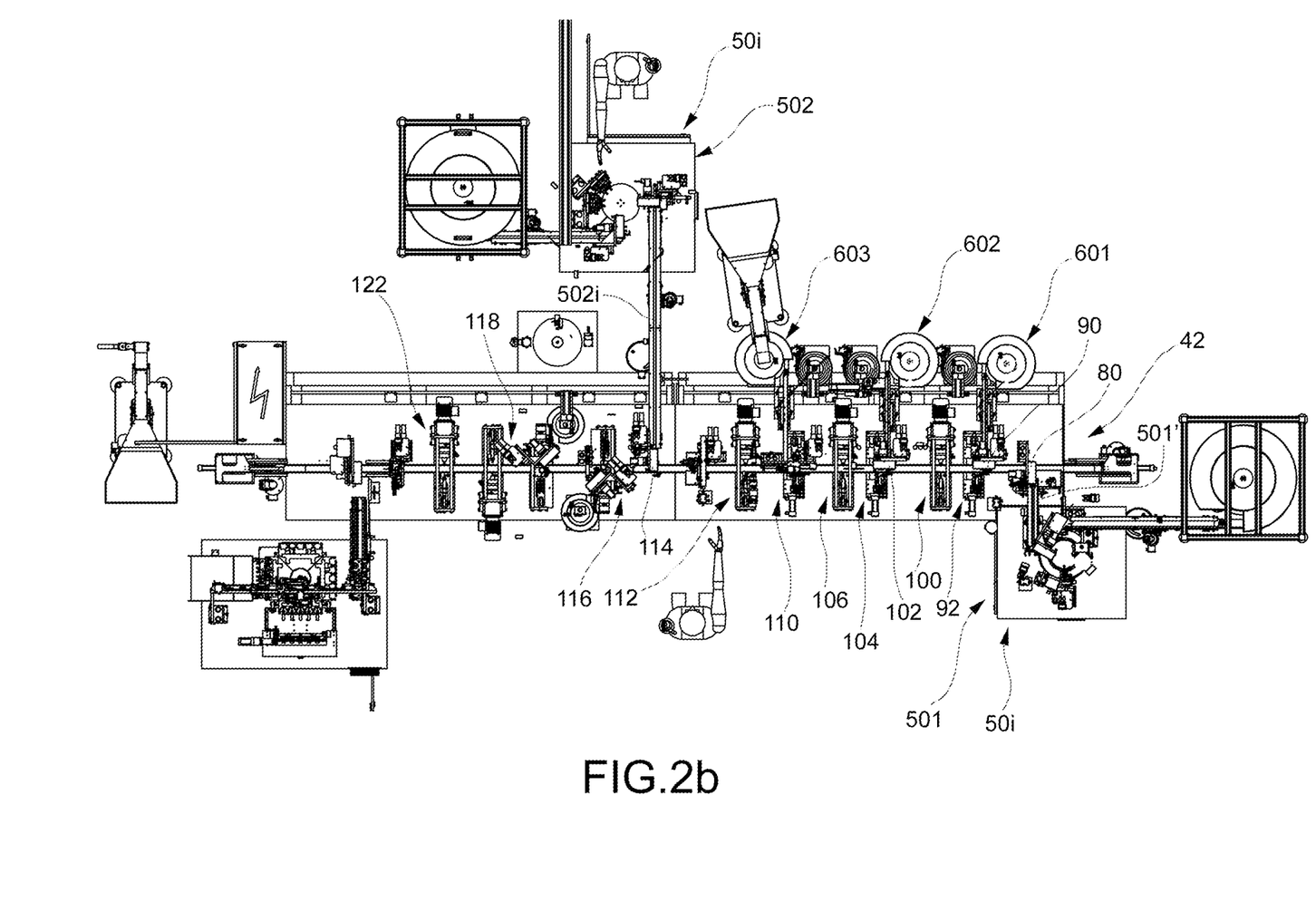
FIG. 2b schematically shows a lay-out of an assembly system comprising an assembly line according to a further embodiment of the invention.

According to a further embodiment of the assembly line (FIG. 2*b*), said line 40 comprises, in addition to the foregoing, a testing device adapted to receive hinges 1*a*, 1*b* assembled by line 40 and to perform a testing on said hinges, especially for checking the spring features.

Figure 10:
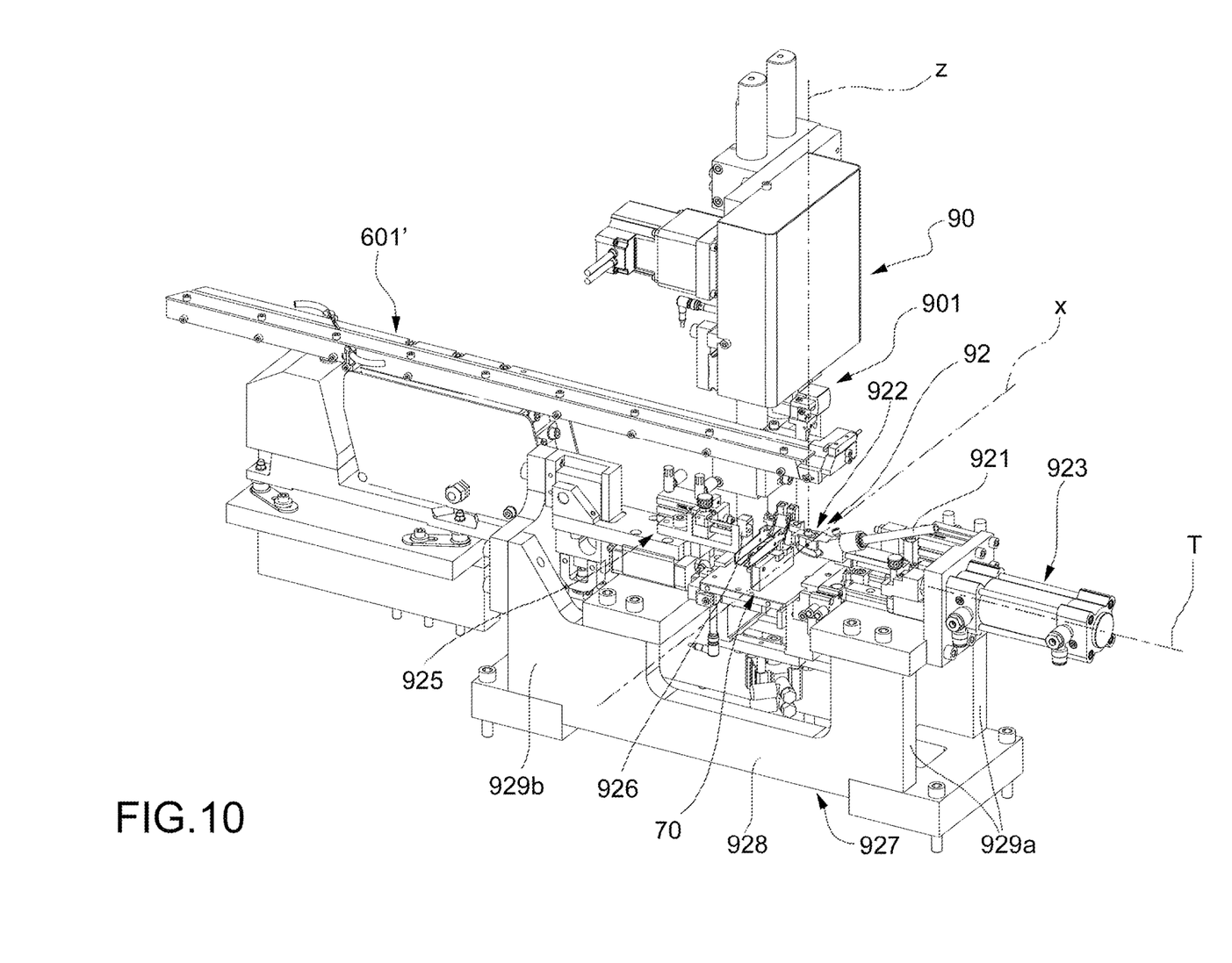
FIG. 10 schematically shows a loading device and an insertion device of the assembly line according to an embodiment of the invention.

With reference to FIG. 10, the loading device 90 cooperates with the feeding device 601, whose vibrating channel 601' feeds a component to be assembled, for example the outer plate 4.

The loading device 90 comprises a gripping hand 901 adapted to grip the component to be assembled and carry out a translation along a vertical direction Z, i.e. along a direction orthogonal to the imaginary transport plane or to the ground plane, so as to bring the component on pallet 70 and deposit it from above in the desired position.

According to a preferred embodiment, the insertion device 92 instead comprises an insertion conduit 921, in which the rivet to be inserted is inserted, and an insertion hand 922, placed at the end of the insertion conduit 921, to which the rivet is fed by the insertion conduit 922, so as to protrudes toward the article being assembled.

The insertion device 92 also comprises movement means suitable for moving the insertion hand along a transverse direction T, orthogonal to the transport direction X; for example, said movement means comprise a cylinder-piston assembly 923, which moves together the insertion conduit 921 and the insertion hand 922.

The insertion device 92 also comprises an abutment device 925, placed on the side opposite to the insertion hand 922 with respect to the conveyor belt 42.

The abutment device 925 includes an abutment 926 movable along said transverse direction T; for example, abutment 926 is movable by pneumatic means.

In normal operation, after having loaded the gripping hand 922 with a rivet to be inserted, the gripping hand 922 and abutment 926 are translated along the translation direction T, so as to approach to pallet 70 and operate on the article being assembled.

In particular, abutment 926 engages the article being assembled so as to mutually position and maintain in the desired position the components which must be engaged by the rivet, so that the rivet inserted by the insertion hand 922 proceeds through properly aligned holes.

The insertion device 92 also comprises a frame 927 comprising a base 928 and lateral shoulders 929a, 929b, which respectively support the insertion hand 922, the insertion conduit 921 and the cylinder-piston assembly 923 on the one hand, and the abutment device 925 on the other.

The insertion hand 922 and abutment 926 are adjustable in height, i.e. along the vertical direction Z, so as to adjust the height according to the dimensional requirements dictated by the article to be assembled.

Advantageously, the insertion device 92 forms an independent unit, associable to the transport system and adjustable according to the dimensional requirements of the article to be assembled.

Figure 11:
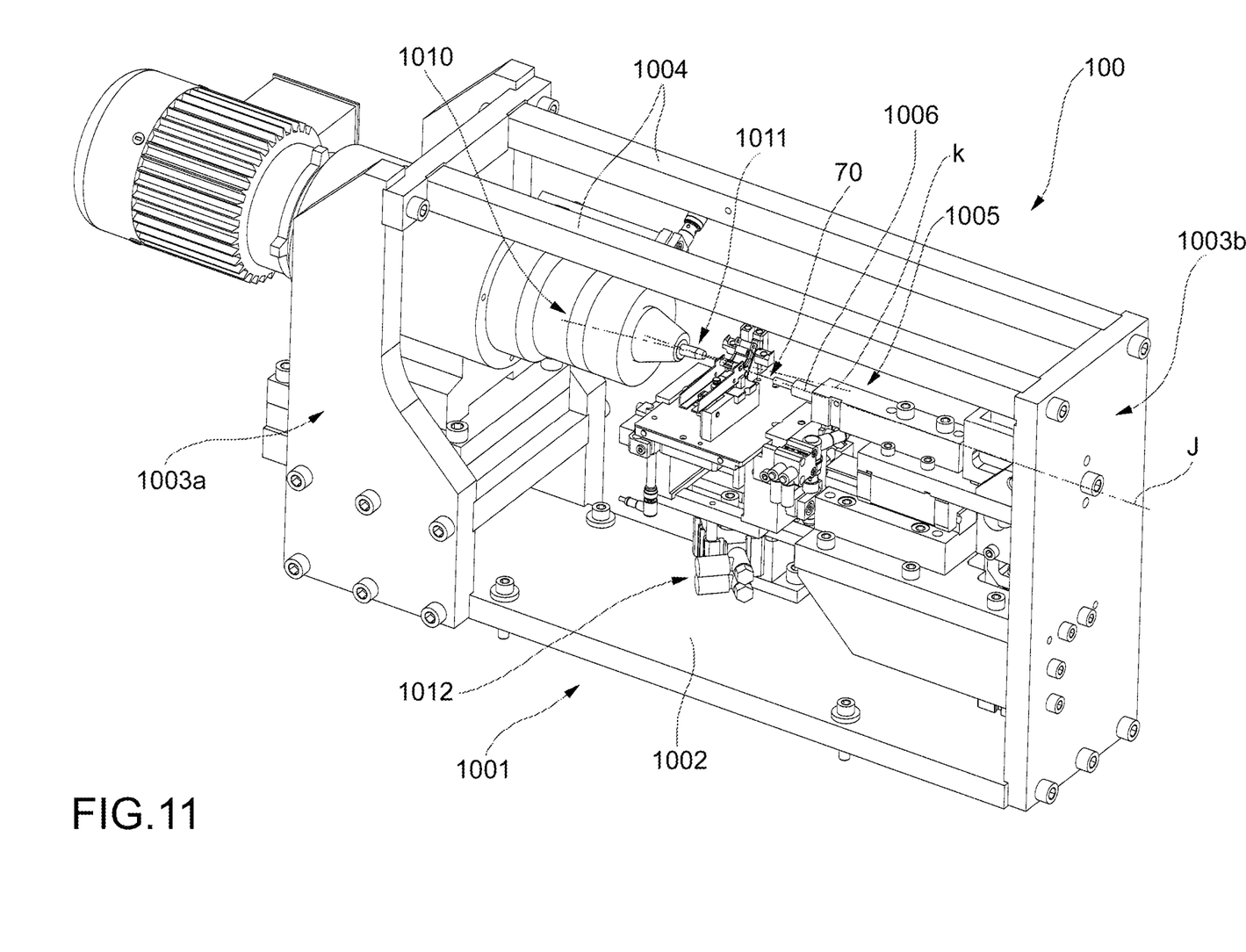
FIG. 11 schematically shows a riveting machine of the assembly line according to an embodiment of the invention.

With reference to FIG. 11, the riveting machine 100 comprises a frame 1001 preferably comprising a base 1002, placed inferiorly, lateral shoulders 1003a, 1003b connected to base 1002 and protruding vertically from it, and at least one cross member 1004, which joins the lateral shoulders 1003a, 1003b, surmounting the conveyor belt 42.

Frame 1001 thus forms a closed ring structure, traversed by the conveyor belt 42.

Machine 100 further comprises a stop device 1005, supported by one of said shoulders 1003b, 1003a, comprising a stop 1006, for example in the form of a strut.

Stop 1006 is translatable along a transverse direction J perpendicular to the advancement direction X, so as to approach the article being assembled, on the side of the rivet head.

Machine 100 further comprises a riveting device 1010, supported on the other shoulder 1003a, 1003b, which comprises a crushing head 1011 in the form of rotating tip.

The crushing head 1011 is translatable along the transverse direction J.

According to a preferred embodiment, the crushing head 1011 extends along a head direction K, which coincides with the axis of rotation, incident to the transverse direction J.

Advantageously, this mutual arrangement of the transverse direction J and the head direction K facilitates the crushing of the rivet end, thus facilitating the riveting.

The crushing head 1011 and stop 1006 are adjustable in height, i.e. along the vertical direction Z, so as to adjust the height with respect to the conveyor belt, thus facilitating and speeding up the setup operations of line 40.

Preferably, moreover, machine 100 comprises lifting means 1012, for example pneumatic, suitable for lifting pallet 70, so as to align the height of the rivet to be riveted with the crushing head 1011 and with stop 1006.

Preferably, said lifting means 1012 comprise a cylinder-piston assembly and a plurality of calibrated bodies, usable for lengthening or shortening the piston stem, so as to position the pallet at the desired height in order to align the rivet with the crushing head and with the stop, according to the dimensional requirements of the article being assembled.

Innovatively, the assembly line according to the present invention meets the needs of the industry, since it allows assembling complex multicomponent articles at a high speed.

Advantageously, in particular, the riveting process performed along horizontal transverse axes, i.e. parallel to the ground plane, and orthogonal to the advancement direction, allows achieving very high assembly speeds, even more than 2,500 articles/hour in the case of the above hinges, assembling a hinge at a time.

Advantageously, moreover, these hinges are complete with any component and consisting of any type of component (any type of box, shock absorber, wing).

According to a further advantageous aspect, the loading and positioning of the article components from above further speeds up the assembly and prevents problems of footprint and interference between the trajectories of the line components.

Advantageously, moreover, the line according to the invention greatly improves the operator's accessibility for the maintenance activities on the machine. In particular, the line according to the invention reduces the time of some maintenance operations by about ⅓.

According to a still further advantageous aspect, the line is set up and prepared for production in an easy and fast manner, since the height of the insertion hand and of the abutment and/or the height of the crushing head and of the stop are adjustable on site.

In particular, the line according to the invention allows a production change from a hinge model to another in a time interval of between 5 minutes and half an hour.

According to a further advantageous aspect, the system consists of modular blocks, at most four blocks, mutually positioned according to the product requirements: the first secondary assembling device for the assembly of the wing, the second secondary assembling device for the assembly of the box, the general assembly line and the testing device.

Moreover, advantageously, this modularity allows adding, eliminating or restoring a module according to the needs and the presence of each module in the system is not necessary since the beginning.

It is clear that a man skilled in the art may make changes to the line described above in order to meet incidental needs, all falling within the scope of protection defined in the following claims.

The invention claimed is:
1. Assembly line for assembly of an article comprising a hinge comprising a plurality of components connected by rivets inserted in holes having respective hole axes, comprising:
  a transport system comprising a plurality of pallets moved along a horizontal advancement direction, said pallets being adapted to support said article during assembly so that said hole axes are orthogonal to the advancement direction;
  an insertion device for inserting a rivet engaging two components to be assembled, wherein the insertion device comprises an insertion hand configured to manipulate the rivet to be inserted, the insertion hand being translatable along a first transverse direction horizontal and orthogonal to the advancement direction; and
  wherein the insertion device comprises an abutment positioned on a side opposite to the insertion hand relative to the advancement direction, said abutment being slidable along said first transverse direction to approach the article during assembly, said abutment being configured to engage the two components to position the components properly and maintain the components in a desired position so the rivet to be inserted by the insertion hand proceeds through properly aligned holes;

a riveting machine arranged along the advancement direction, comprising a stop device having a stop, and a riveting device having a crushing head, wherein said stop device and said riveting device flank one of the pallets on opposite sides, wherein the riveting machine is downstream of said insertion device;

wherein the stop and the crushing head are translatable along a second transverse direction horizontal and orthogonal to the advancement direction to approach the article from opposite sides during assembly for riveting the rivet inserted in the two components.

2. Assembly line according to claim 1, wherein the crushing head extends as a tip along a head direction incident to the second transverse direction.

3. Assembly line according to claim 1, wherein the crushing head and the stop are adjustable along a vertical direction.

4. Assembly line according to claim 1, wherein the riveting machine comprises a lift to lift the one of said pallets flanked on opposite sides by said stop device and said riveting device.

5. Assembly line according to claim 1, wherein the riveting machine comprises a frame comprising a base, placed inferiorly, lateral shoulders connected to the base and protruding vertically from the base, and at least one cross member, wherein the cross member joins the lateral shoulders, surmounting the one of said pallets flanked on opposite sides by said stop device and said riveting device, and creating a closed ring structure bearing the riveting device and the stop device.

6. Assembly line according to claim 1, comprising a loading device including a gripping hand to grasp a component to be assembled and to perform a translation along a vertical direction so as to carry the component on one of the pallets and deposit the component from above in a desired position.

7. Assembly line according to claim 1, wherein the insertion hand and the abutment are vertically adjustable in height, so as to adjust the height according to dimensional requirements of the article to be assembled.

8. Assembly line according to claim 1, wherein the insertion device forms an independent unit, associable to the transport system.

9. Assembly line according to claim 1, the insertion device comprising an insertion conduit, in which the rivet to be inserted is inserted, and the insertion hand is placed at an end of the insertion conduit to protrude toward the article being assembled.

10. Assembly line according to claim 1, wherein the insertion device comprises a frame comprising a base and lateral shoulders, which respectively support the insertion hand and the abutment.

11. Assembly line according to claim 1, wherein the transport system comprises a conveyor for moving the article along said horizontal advancement direction, wherein the plurality of pallets are moved by said conveyor along said horizontal advancement direction;

wherein the riveting machine is downstream of said insertion device along said conveyor and along the horizontal advancement direction;

wherein the abutment and the insertion hand are positioned on opposite sides relative to the conveyor and to the horizontal advancement direction to approach the article from opposite sides during assembly for positioning the two components and for inserting the rivet in the two components.

12. Assembly line according to claim 1, wherein the horizontal advancement direction is a rectilinear direction.

13. Method of assembly of hinges by an assembly line for assembly of an article comprising a plurality of components connected by rivets inserted in holes having respective hole axes, comprising:

a transport system comprising a plurality of pallets moved along a horizontal advancement direction, said pallets being adapted to support said article during assembly so that said hole axes are orthogonal to the advancement direction;

an insertion device for inserting a rivet engaging two components to be assembled, wherein the insertion device comprises an insertion hand configured to manipulate the rivet to be inserted, the insertion hand being translatable along a first transverse direction horizontal and orthogonal to the advancement direction; and wherein the insertion device comprises an abutment positioned on a side opposite to the insertion hand relative to the advancement direction, said abutment being slidable along said first transverse direction to approach the article during assembly, said abutment being configured to engage the two components to position the components properly and maintain the components in a desired position so the rivet to be inserted by the insertion hand proceeds through properly aligned holes;

a riveting machine arranged along the advancement direction, comprising a stop device having a stop and a riveting device having a crushing head, wherein said stop device and said riveting device flank one of the pallets on opposite sides;

wherein the stop and the crushing head are translatable along a second transverse direction horizontal and orthogonal to the advancement direction to approach the article from opposite sides during assembly.

14. The method of assembly according to claim 13, comprising advancing the article during assembly along the horizontal advancement direction, maintaining said hole axes horizontal and orthogonal to said advancement direction, up to a first work station; and moving the abutment and the insertion hand in correspondence of said first work station towards each other along the first transverse direction to approach the article from opposite sides during assembly, and positioning the two components properly and maintain the components in a desired position by said abutment, inserting the rivet to be inserted into the two components by the insertion hand.

15. The method of assembly according to claim 13, comprising advancing the article during assembly along the horizontal advancement direction, maintaining said hole axes horizontal and orthogonal to said advancement direction, up to a second work station.

16. The method of assembly according to claim 15, comprising moving the stop and the crushing head in correspondence of said second work station towards each other along the second transverse direction to approach the article from opposite sides during assembly, and performing a riveting.

17. The method of assembly according to claim 15, comprising moving the insertion hand and the abutment in correspondence of said work station towards each other along the first transverse direction to approach the article from opposite sides during assembly, and performing an insertion of the rivet.

\* \* \* \* \*